United States Patent
Lee et al.

(10) Patent No.: US 8,311,108 B2
(45) Date of Patent: Nov. 13, 2012

(54) MULTI-VIEW IMAGE CODING APPARATUS AND METHOD

(75) Inventors: Seok Lee, Seoul (KR); Du Sik Park, Suwon-si (KR); Jaejoon Lee, Seoul (KR); Ho Cheon Wey, Seongnam-si (KR); Il Soon Lim, Hongseong-gun (KR); Jin Young Lee, Ansan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 421 days.

(21) Appl. No.: 12/585,956

(22) Filed: Sep. 29, 2009

(65) Prior Publication Data
US 2010/0290518 A1    Nov. 18, 2010

(30) Foreign Application Priority Data
May 14, 2009    (KR) .................. 10-2009-0041973

(51) Int. Cl.
*H04N 7/12*    (2006.01)
*A61B 1/04*    (2006.01)

(52) U.S. Cl. ..................................... 375/240.12; 348/73

(58) Field of Classification Search ............ 375/240.12, 375/240.13, 240.14, 240.16, 240.27; 382/239, 382/232, 236, 238; 348/73
See application file for complete search history.

(56) References Cited

U.S. PATENT DOCUMENTS

| | | | |
|---|---|---|---|
| 6,907,071 B2 * | 6/2005 | Frojdh et al. | 375/240.12 |
| 7,369,707 B2 * | 5/2008 | Sakaguchi et al. | 382/239 |
| 8,036,281 B2 * | 10/2011 | Kobayashi | 375/240.26 |

FOREIGN PATENT DOCUMENTS

| | | |
|---|---|---|
| KR | 10-2006-0065553 | 6/2006 |
| KR | 10-2006-0083053 | 7/2006 |
| KR | 10-2006-0104671 | 10/2006 |
| KR | 10-2007-0080449 | 8/2007 |
| KR | 10-2008-0016266 | 2/2008 |
| KR | 10-2008-0034073 | 4/2008 |

* cited by examiner

*Primary Examiner* — Hanh Nguyen
(74) *Attorney, Agent, or Firm* — Staas & Halsey LLP

(57) ABSTRACT

A multi-view image coding apparatus and method are provided. The multi-view image coding apparatus may extract geometric information from a plurality of cameras, may construct a spatial prediction structure to enable a correlation of each view to be maximum using the geometric information, and thereby may code and transmit a multi-view image.

19 Claims, 12 Drawing Sheets

MULTI-VIEW IMAGE CODING APPARATUS AND METHOD

CROSS-REFERENCE TO RELATED APPLICATIONS

This application claims the priority benefit of Korean Patent Application No. 10-2009-0041973, filed on May 14, 2009, in the Korean Intellectual Property Office, the disclosure of which is incorporated herein by reference.

BACKGROUND

1. Field

Exemplary embodiments relate to a multi-view image coding apparatus and method for an efficient image coding, and more particularly, to a multi-view image coding apparatus and method that may construct a spatial prediction structure using a geometric structure of a camera and code a multi-view image.

2. Description of the Related Art

When multi-view video data of a single scene is obtained, a temporal correlation and a spatial correlation may exist. The temporal correlation may be associated with a time change for each camera view, and the spatial correlation may be associated with each view from a single viewpoint. In a temporal correlation, since an order based on a time axis is obvious, coding may be performed by predicting based on an image with a smallest time difference. However, an order of a prediction structure for a spatial correlation of each view may not be accurately determined with respect to a multi-view image.

Accordingly, a multi-view image coding apparatus and method that may analyze geometric information from a position and a location of each view, design a spatial prediction structure with a high spatial correlation, and increase a coding efficiency is required.

SUMMARY

According to exemplary embodiments, there may be provided a multi-view image coding apparatus, including: a geometric information extraction unit to extract geometric information from a plurality of cameras; a spatial prediction structure determination unit to determine a spatial prediction structure of images of the plurality of cameras using the geometric information; and a multi-view image coding unit to code the images of the plurality of cameras based on the spatial prediction structure using at least one processor.

The spatial prediction structure determination unit may include an average view computation unit to compute an average view of the plurality of cameras, a distance computation unit to compute a distance between each of the plurality of cameras, and an image selection unit to select each of the images of the plurality of cameras as one of an intra-picture, a bidirectionally predictive picture, and a unidirectionally predicted picture, using the average view and the distance.

The image selection unit may include an I image selection unit to select an image of a camera, most adjacent to the average view, as the intra-picture, a B image selection unit to select an image of a camera, most adjacent to the intra-picture, as the bidirectionally predictive picture, and a P image selection unit to select an image of a camera, most adjacent to the bidirectionally predictive picture, as the unidirectionally predicted picture.

When at least two images exist that are not selected as one of the intra-picture, the bidirectionally predictive picture, and the unidirectionally predicted picture, the image selection unit may select the at least two images as the bidirectionally predictive picture and the unidirectionally predicted picture, and when one image exists that is not selected as one of the intra-picture, the bidirectionally predictive picture, and the unidirectionally predicted picture, the image selection unit may select the unselected image as the unidirectionally predicted picture.

The multi-view image coding unit may code the unidirectionally predicted picture by referring to the intra-picture, and code the bidirectionally predictive picture by referring to the intra-picture and the unidirectionally predicted picture.

The multi-view image coding apparatus may further include a temporal prediction structure determination unit to determine a temporal prediction structure used to predict a correlation based on a time change with respect to each of the images of the plurality of cameras, and a temporal image coding unit to code each of the images of the plurality of cameras based on the temporal prediction structure.

The multi-view image coding apparatus may further include a transmission unit to selectively transmit any one of the intra-picture, the bidirectionally predictive picture, and the unidirectionally predicted picture.

According to other exemplary embodiments, there may be provided a multi-view image coding method, including: extracting geometric information from a plurality of cameras; determining a spatial prediction structure of images of the plurality of cameras using the geometric information; and coding the images of the plurality of cameras based on the spatial prediction structure, wherein the method is performed using at least one processor. At least one computer-readable recording medium may store a program for implementing a multi-view image coding method.

The multi-view image coding method may further include selectively transmitting any one of an intra-picture, a bidirectionally predictive picture, and a unidirectionally predicted picture.

The transmitting may transmit at least one of the intra-picture and the unidirectionally predicted picture, when a transmission bandwidth is equal to or less than a predetermined value.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
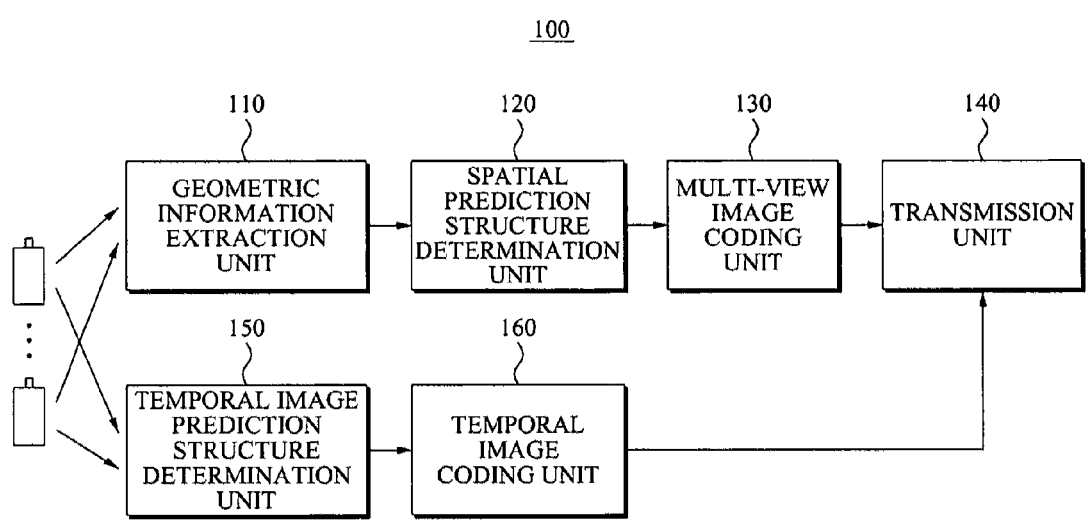
FIG. 1 illustrates a configuration of a multi-view image coding apparatus according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 illustrates a configuration of a multi-view image coding apparatus 100 according to exemplary embodiments.

Referring to FIG. 1, the multi-view image coding apparatus 100 may include a geometric information extraction unit 110, a spatial prediction structure determination unit 120, and a multi-view image coding unit 130. The multi-view image coding apparatus 100 may determine a priority of views from a parameter with respect to image data obtained from multiple views, construct a prediction structure to enable a correlation of each of the views to be maximum, and perform coding and transmission. Here, the parameter may indicate a position and a location of each camera.

The geometric information extraction unit 110 may extract geometric information from a plurality of cameras. The geometric information may include at least one of position information and location information of each of the plurality of cameras.

The spatial prediction structure determination unit 120 may determine a spatial prediction structure of images of the plurality of cameras using the geometric information. That is, the spatial prediction structure determination unit 120 may determine a structure to predict spatially arranged images using the geometric information. The spatial prediction structure determination unit 120 is described in detail with reference to FIG. 2.

Figure 2:
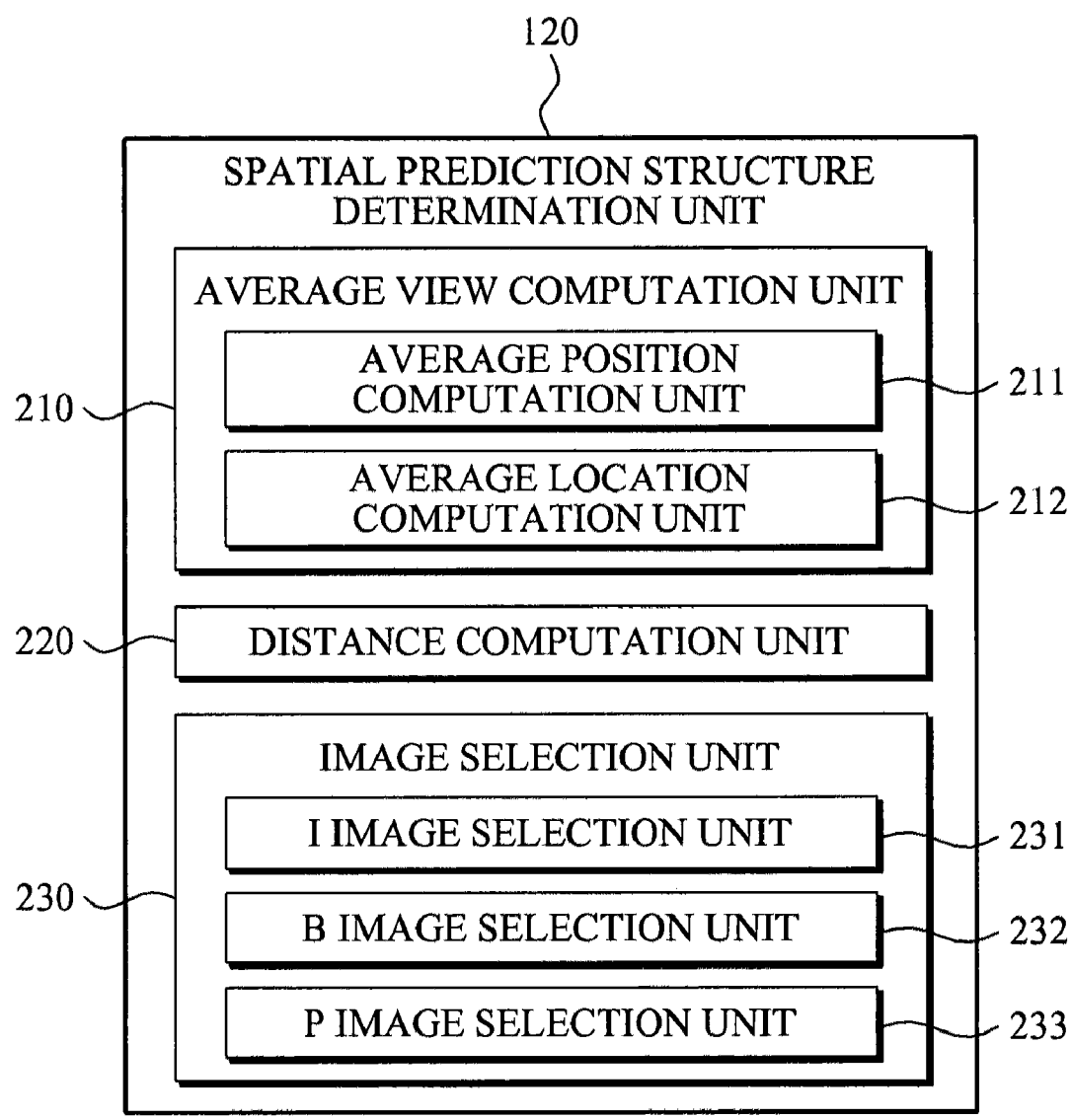
FIG. 2 illustrates an example of a configuration of a spatial prediction structure determination unit of FIG. 1.

FIG. 2 illustrates an example of a configuration of a spatial prediction structure determination unit 120 of FIG. 1.

Referring to FIG. 2, the spatial prediction structure determination unit 120 may include an average view computation unit 210, a distance computation unit 220, and an image selection unit 230.

The average view computation unit 210 may compute an average view of the plurality of cameras. Also, the average view computation unit 210 may include an average position computation unit 211, and an average location computation unit 212. The average position computation unit 211 may compute an average position of the plurality of cameras. The average location computation unit 212 may compute an average location of the plurality of cameras. Accordingly, the average view computation unit 210 may compute the average view using the average position and the average location.

The distance computation unit 220 may compute a distance between each of the plurality of cameras.

Here, an operation of computing the average location and the distance of each of the plurality of cameras is described in detail with reference to FIG. 3.

Figure 3:
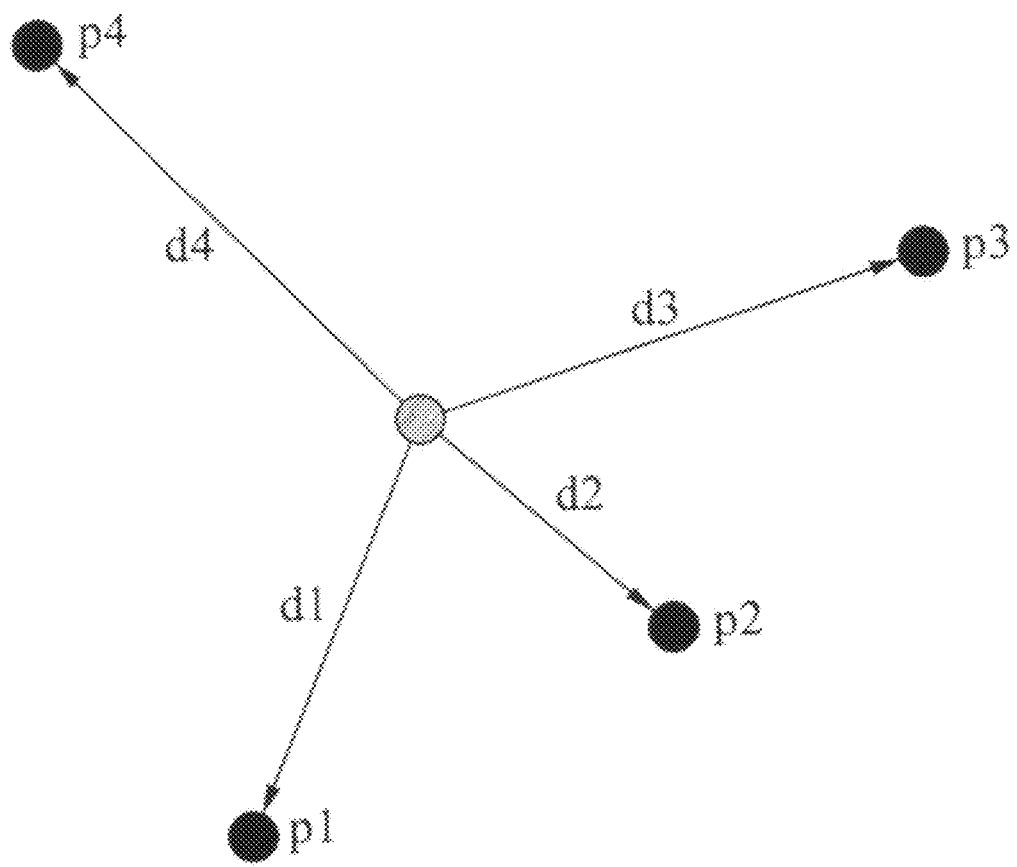
FIG. 3 conceptually illustrates a geometric mean of views of a camera according to exemplary embodiments.

FIG. 3 conceptually illustrates a geometric mean of views of a camera according to exemplary embodiments.

Referring to FIG. 3, with respect to each point, $p_1, p_2, \ldots p_n$, which is a two-dimensional (2D) point, a distance between two given points may be defined as a Euclidean distance and represented as, $$d(p_1, p_2) = \sqrt{(x_1-x_2)^2 + (y_1-y_2)^2} \quad \text{[Equation 1]}$$

When the distance is defined, a mean to minimize a sum of distances between an arbitrary point and each of the points may be defined. The mean may be equal to an arithmetic mean of all points, for 2D points. That is, a mean of all the 2D points may be represented as, $$\bar{p} = \frac{1}{n}\sum_{i=1}^{n} p_i \quad \text{[Equation 2]}$$

When a view of a camera is used as an element, a geometric distance and an average of each element may be defined. A matrix $T \in \mathfrak{R}^{4\times 4}$, indicating a three-dimensional position and location of a camera, may be represented as $$T = \begin{bmatrix} R & p \\ 0 & 1 \end{bmatrix}$$

with respect to a rotation matrix $R \in \mathfrak{R}^{3\times 3}$ and a location vector $p \in \mathfrak{R}^3$.

Also, the distance between each view may be represented as, $$d(T_1, T_2) = \alpha \|\log(R_1^T R_2)\| + \beta \|p_1 - p_2\| \quad \text{[Equation 3]}$$

where $\alpha$ and $\beta$ may be an arbitrary positive number. The average view may be represented as an average position $\bar{R}$ and an average location $\bar{p}$. $\bar{R}$ may be calculated as follows. When a sum of rotation matrices is represented as $\Sigma_{i=1}^{n} R_i = USV^T$ using a Singular Value Decomposition (SVD), $\bar{R}$ may be given by $\bar{R} = UV^T$.

Accordingly, the average location may be represented as, $$\bar{T} = \begin{bmatrix} \bar{R} & \bar{p} \\ 0 & 1 \end{bmatrix} \quad \text{[Equation 4]}$$

Referring again to FIG. 2, the image selection unit 230 may select each of the images of the plurality of cameras as one of an intra-picture, a bidirectionally predictive picture, and a unidirectionally predicted picture, using the average view and the distance. The image selection unit 230 may include an I image selection unit 231, a B image selection unit 232, and a P image selection unit 233. The I image may denote an intra-picture which is a coded image in a frame. Also, the I image may be coded from a single frame, and be independently restored. The P image may denote a unidirectionally predicted picture, and be coded by compensating for movement based on the I image and another P image, and performing a Discrete Cosine Transform (DCT) with respect to a remaining difference.

The B image may denote a bidirectionally predictive picture.

The I image selection unit 231 may select an image of a camera, most adjacent to the average view, as the intra-picture.

The B image selection unit 232 may select an image of a camera, most adjacent to the intra-picture, as the bidirectionally predictive picture.

The P image selection unit 233 may select an image of a camera, most adjacent to the bidirectionally predictive picture, as the unidirectionally predicted picture.

The selecting of the B image and the P image may be repeatedly performed with respect to remaining images of remaining cameras. In this instance, when at least two images that are not selected as one of the intra-picture, the bidirectionally predictive picture, and the unidirectionally predicted picture exist, the image selection unit 230 may select the at least two images as the bidirectionally predictive picture and the unidirectionally predicted picture. When one image that is not selected as one of the intra-picture, the bidirectionally predictive picture, and the unidirectionally predicted picture exists, and a total number of views is an even number, the image selection unit 230 may select the unselected image as the unidirectionally predicted picture.

Referring again to FIG. 1, the multi-view image coding unit 130 may code the images of the plurality of cameras based on the spatial prediction structure. In this instance, the multi-view image coding unit 130 may code the unidirectionally predicted picture by referring to the intra-picture, and code the bidirectionally predictive picture by referring to the intra-picture and the unidirectionally predicted picture.

Also, the multi-view image coding apparatus 100 may further include a temporal prediction structure determination unit (150) and a temporal image coding unit (160).

The temporal prediction structure determination unit may determine a temporal prediction structure used to predict a correlation based on a time change with respect to each of the images of the plurality of cameras. The temporal image coding unit may code each of the images of the plurality of cameras based on the temporal prediction structure. That is, a spatial prediction with respect to a multi-view image and temporal prediction for each of the cameras may be made by applying the spatial prediction structure to the temporal prediction structure.

Also, the multi-view image coding apparatus 100 may further include a transmission unit (140). The transmission unit may selectively transmit any one of the intra-picture, the bidirectionally predictive picture, and the unidirectionally predicted picture. Specifically, the transmission unit may selectively transmit at least one of the intra-picture and the unidirectionally predicted picture, when transmission data is to be controlled, for example, when a transmission bandwidth is equal to or less than a predetermined value.

As described above, a spatial prediction structure may be determined using a geometric structure of a multi-view image, the multi-view image may be coded, and thus a coding efficiency may be improved.

Also, since an amount of transmission data may be easily controlled depending on a bandwidth, a number of views may be easily adjusted without a new coding process, and the amount of transmission data may be adaptively adjusted.

Figure 4:
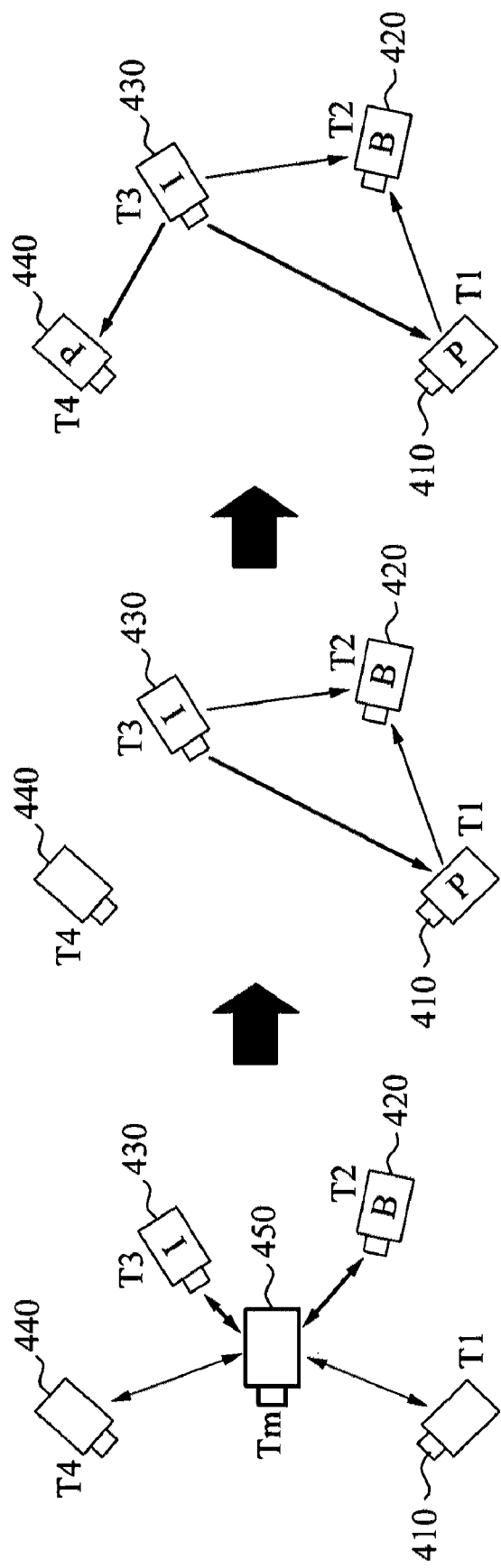
FIG. 4 illustrates an operation of constructing a prediction structure of four views according to exemplary embodiments.

FIG. 4 illustrates an operation of constructing a prediction structure of four views according to exemplary embodiments. An example for constructing the prediction structure is described.

An average of all views may be calculated, and a distance between the average view and each of the views may be computed. Subsequently, a view, most adjacent to the average view, may be used as a center view and selected as an I image. Here, a view may indicate an image. Subsequently, a view, most adjacent to the center view from among remaining views, may be selected as a B image. Also, a view, most adjacent to the selected B image from among remaining views, may be selected as a P image. Both the center view and the selected P image are referred to when the B image refers to either of the center view and the selected P image. The selecting of the B image and selecting of the P image may be repeated. However, when a single view remains, and the total number of views is an even number, the single view may be selected as the P image.

In a multi-view image using four cameras, T1 410, T2 420, T3 430, and T4 440, in FIG. 4, a view of T3 430 which is most adjacent to the average view Tm 450 may be selected as the I image (intra-picture) with respect to each view of the cameras, T1 410, T2 420, T3 430, and T4 440. Also, a view of T2 420, which is most adjacent to the intra-picture, may be selected as the B image (bidirectionally predictive picture). Also, a view of T1 410, which is most adjacent to the T2 420 excluding the selected T3 430 and the selected T2 420, may be selected as the P image (unidirectionally predicted picture). T2 420 may mutually refer to T3 430 and T1 410.

Figure 5:
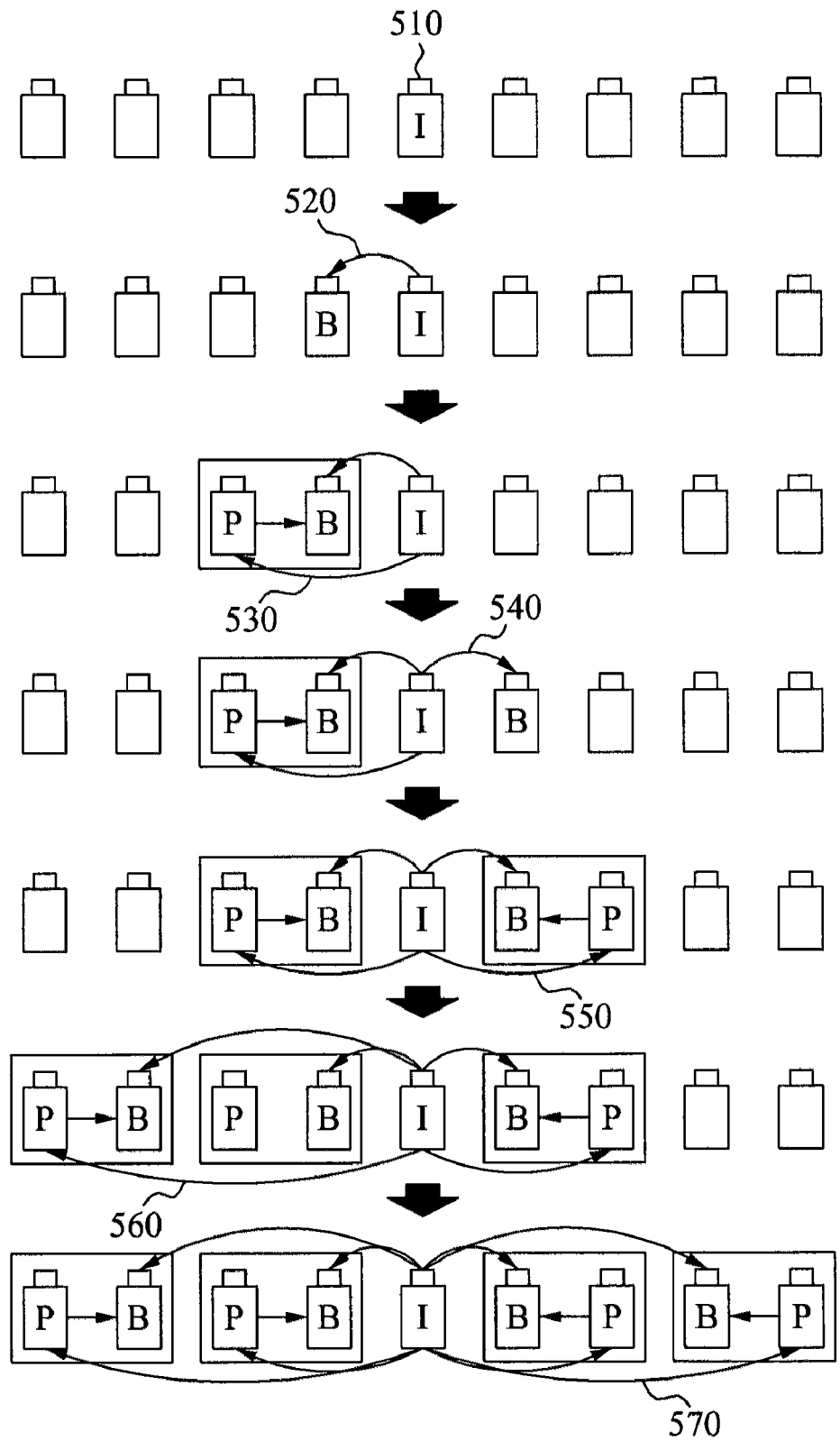
FIG. 5 illustrates an operation of constructing a prediction structure of nine parallel views according to other exemplary embodiments.

FIG. 5 illustrates an operation of constructing a prediction structure of nine parallel views according to other exemplary embodiments.

Referring to FIG. 5, an average view 510 of the nine views may be obtained, and the average view 510 may be selected as an I image.

In operation 520, a view, most adjacent to the average view 510, may be selected as a B image. In operation 530, a view, most adjacent to the B image, may be selected as a P image.

Also, the selecting of the B image and selecting of the P image may be repeated with respect to unselected views. Accordingly, in operation 540, a view, most adjacent to the I image from among the unselected views, may be selected as the B image. In operation 550, a view, most adjacent to the selected B image, may be selected as the P image. In operation 560 and operation 570, unselected views may be selected as the B image and the P image.

Figure 6A:
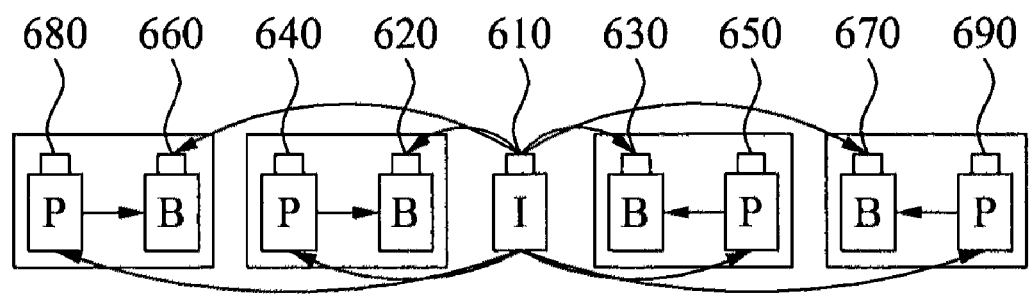
FIGS. 6A, 6B, and 6C illustrate an operation of reducing and transmitting data in a prediction structure of nine parallel views according to exemplary embodiments.
Figure 6B:
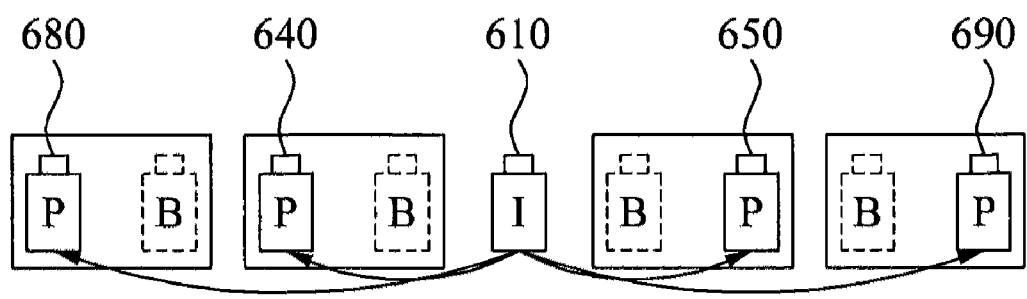
Figure 6C:
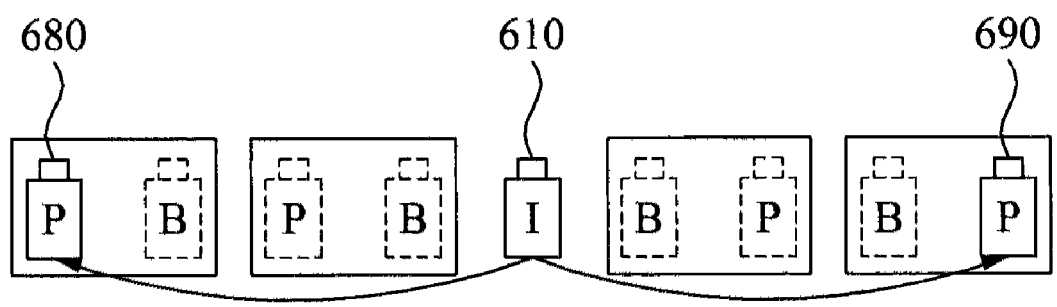

FIGS. 6A, 6B, and 6C illustrate an operation of reducing and transmitting data in a prediction structure of nine parallel views according to exemplary embodiments.

Referring to FIGS. 6A, 6B, and 6C, when all the nine views are to be transmitted according to a transmission environment, the nine views 610, 620, 630, 640, 650, 660, 670, 680, and 690 may be transmitted as shown in FIG. 6A. However, when only half of the nine views is to be transmitted, only the I image 610 and the P images 640, 650, 680, and 690 excluding B images in a prediction structure of FIG. 6B may be transmitted. That is, the five views 610, 640, 650, 680, and 690 may be selectively transmitted as shown in FIG. 6B. Also, when only a quarter of the nine views is to be transmitted, structure building may be performed with respect to the five views 610, 640, 650, 680, and 690, the B image and the P image may be determined again, and views corresponding to the B image may be excluded. Accordingly, only three views may be selectively transmitted as shown in FIG. 6C.

The above-described embodiment that selectively transmits views may maintain a geometric structure of an entire multi-view camera system. That is, although a number of views may be reduced from nine views to three views, a rendering capability of a view configuration may be maintained.

Figure 7:
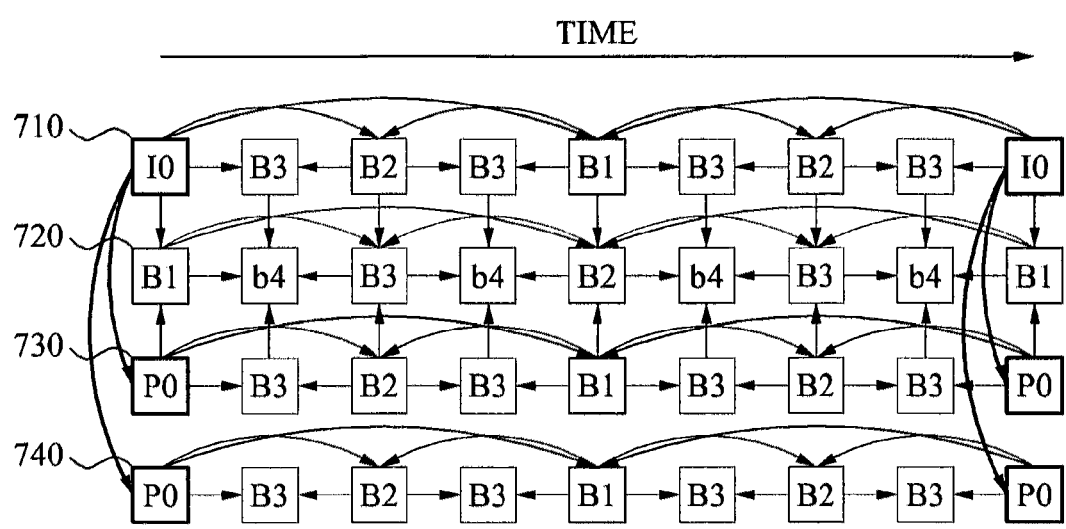
FIG. 7 illustrates a structure where a spatial prediction structure is applied to a temporal prediction structure according to exemplary embodiments.

FIG. 7 illustrates a structure where a spatial prediction structure is applied to a temporal prediction structure according to exemplary embodiments.

Referring to FIG. 7, in a multi-view image using four cameras 710, 720, 730, and 740, a spatial prediction of the four cameras 710, 720, 730, and 740, as well as a temporal prediction for each of the cameras 710, 720, 730, and 740 may be performed. Accordingly, a coding efficiency may be improved.

Figure 8:
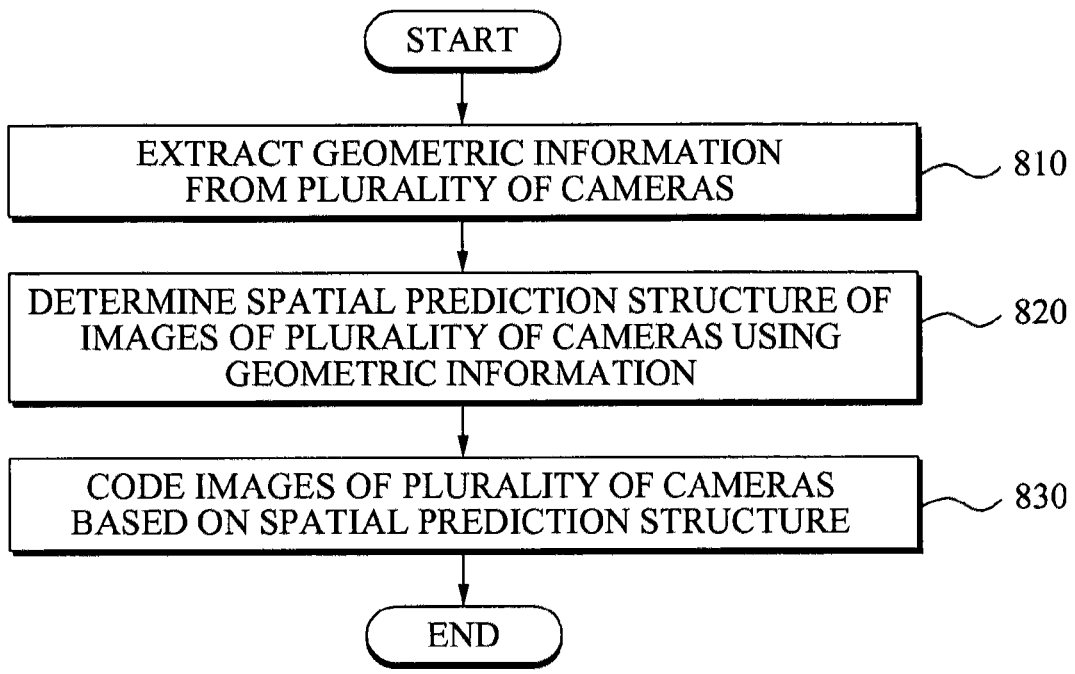
FIG. 8 illustrates a flowchart of a multi-view image coding method according to exemplary embodiments.

FIG. 8 illustrates a flowchart of a multi-view image coding method according to exemplary embodiments.

Referring to FIG. 8, in operation 810, geometric information may be extracted from a plurality of cameras. For example, the geometric information may include at least one of position information and location information of each of the plurality of cameras.

In operation 820, a spatial prediction structure of images of the plurality of cameras may be determined using the geometric information. The determining in operation 820 is described in detail with reference to FIG. 9.

Figure 9:
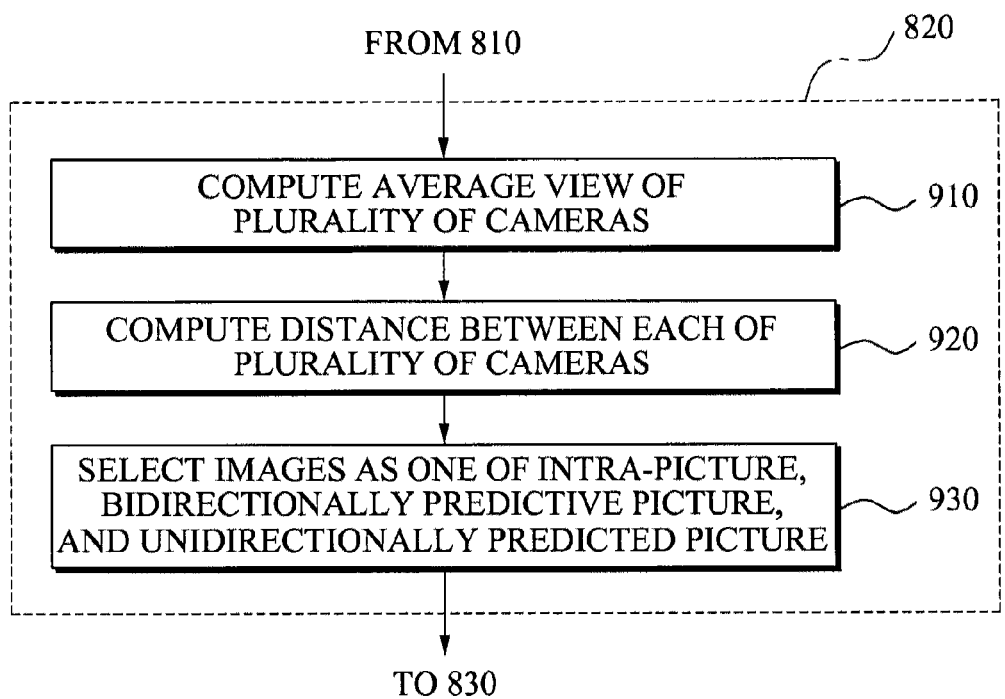
FIG. 9 illustrates a flowchart of an operation of determining a spatial prediction structure of FIG. 8.

FIG. 9 illustrates a flowchart of an operation of determining a spatial prediction structure of FIG. 8. Referring to FIG. 9, in operation 910, an average view of the plurality of cameras may be computed. In operation 920, a distance between each of the plurality of cameras may be computed.

In operation 930, each of the images of the plurality of cameras may be selected as one of an intra-picture, a bidirectionally predictive picture, and a unidirectionally predicted picture, using the average view and the distance. The selecting in operation 930 is described in detail with reference to FIG. 10.

Figure 10:
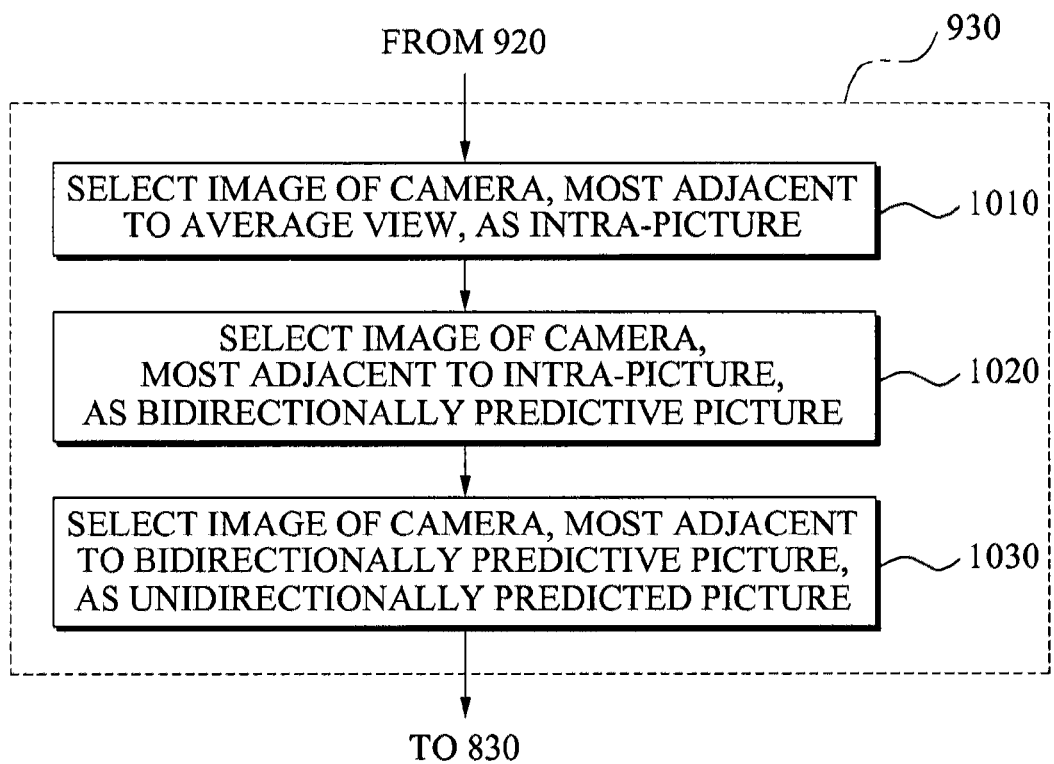
FIG. 10 illustrates a flowchart of an operation of selecting images of a plurality of cameras of FIG. 9.

FIG. 10 illustrates a flowchart of an operation of selecting images of a plurality of cameras of FIG. 9. Referring to FIG. 10, in operation 1010, an image of a camera, most adjacent to the average view, may be selected as the intra-picture (I image).

In operation 1020, an image of a camera, most adjacent to the intra-picture, may be selected as the bidirectionally predictive picture (B image).

In operation 1030, an image of a camera, most adjacent to the bidirectionally predictive picture, may be selected as the unidirectionally predicted picture (P image).

In this instance, the selecting in operation 1020 and the selecting in operation 1030 may be repeatedly performed with respect to unselected images. Accordingly, although a single intra-picture may exist, a plurality of unidirectionally predicted pictures and bidirectionally predictive pictures may exist. Here, when the images of the plurality of cameras are selected by repeating the selecting in operation 1020 and the selecting in operation 1030, and when a single unselected image remains, the unselected image may be selected as the P image.

Referring to again FIG. 8, in operation 830, the images of the plurality of cameras may be coded based on the spatial prediction structure.

Also, a spatial and temporal prediction structures are applied, and thus the spatial prediction structure may be applied to images of a plurality of cameras and a temporal prediction structure may be applied to at least one image of each of the plurality of cameras.

Also, any one of an intra-picture, a bidirectionally predictive picture, and a unidirectionally predicted picture may be selectively transmitted depending on a transmission bandwidth using the spatial prediction structure without a new coding process.

As described above, the spatial prediction structure may be constructed using geometric information of the plurality of cameras, and thus a spatial correlation may be maximized and a coding efficiency may be improved.

The multi-view image coding method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A multi-view image coding apparatus, comprising:
a geometric information extraction unit to extract geometric information from a plurality of cameras;
a spatial prediction structure determination unit to determine a spatial prediction structure of images of the plurality of cameras using the geometric information; and
a multi-view image coding unit to code the images of the plurality of cameras based on the spatial prediction structure using at least one processor,
wherein the spatial prediction structure determination unit comprises:
an average view computation unit to compute an average view of the plurality of cameras; and
a distance computation unit to compute a distance between the average view and a view of each of the plurality of cameras.

2. The multi-view image coding apparatus of claim 1, wherein the spatial prediction structure determination unit further comprises:
an image selection unit to select each of the images of the plurality of cameras as one of an intra-picture, a bidirectionally predictive picture, and a unidirectionally predicted picture, using at least one of the average view and the distance.

3. The multi-view image coding apparatus of claim 2, wherein the image selection unit comprises:
an I image selection unit to select an image of a camera, most adjacent to the average view, as the intra-picture;
a B image selection unit to select an image of a camera, most adjacent to the intra-picture, as the bidirectionally predictive picture; and
a P image selection unit to select an image of a camera, most adjacent to the bidirectionally predictive picture, as the unidirectionally predicted picture.

4. The multi-view image coding apparatus of claim 3, wherein, when at least two images exist that are not selected as one of the intra-picture, the bidirectionally predictive picture, and the unidirectionally predicted picture, the image selection unit selects the at least two images as the bidirectionally predictive picture and the unidirectionally predicted picture, and
when one image exists that is not selected as one of the intra-picture, the bidirectionally predictive picture, and the unidirectionally predicted picture, the image selection unit selects the unselected image as the unidirectionally predicted picture.

5. The multi-view image coding apparatus of claim 2, wherein the average view computation unit comprises:
an average position computation unit to compute an average position of the plurality of cameras; and
an average location computation unit to compute an average location of the plurality of cameras,
wherein the average view is computed using the average position and the average location.

6. The multi-view image coding apparatus of claim 2, wherein the multi-view image coding unit codes the unidirectionally predicted picture by referring to the intra-picture, and codes the bidirectionally predictive picture by referring to the intra-picture and the unidirectionally predicted picture.

7. The multi-view image coding apparatus of claim 2, further comprising:
a temporal prediction structure determination unit to determine a temporal prediction structure used to predict a correlation based on a time change with respect to each of the images of the plurality of cameras; and
a temporal image coding unit to code each of the images of the plurality of cameras based on the temporal prediction structure.

8. The multi-view image coding apparatus of claim 2, further comprising:
a transmission unit to selectively transmit any one of the intra-picture, the bidirectionally predictive picture, and the unidirectionally predicted picture.

9. The multi-view image coding apparatus of claim 8, wherein the transmission unit transmits at least one of the intra-picture and the unidirectionally predicted picture, when a transmission bandwidth is equal to or less than a predetermined value.

10. A multi-view image coding method, comprising:
extracting geometric information from a plurality of cameras;
determining a spatial prediction structure of images of the plurality of cameras using the geometric information; and
coding the images of the plurality of cameras based on the spatial prediction structure,
wherein the determining of the spatial prediction structure comprises:
computing an average view of the plurality of cameras; and
computing a distance between the average view and a view of each of the plurality of cameras, and
wherein the method is performed using at least one processor.

11. The multi-view image coding method of claim 10, wherein the determining of the spatial prediction structure further comprises:
selecting each of the images of the plurality of cameras as one of an intra-picture, a bidirectionally predictive picture, and a unidirectionally predicted picture, using at least one of the average view and the distance.

12. The multi-view image coding method of claim 11, wherein the selecting comprises:
selecting an image of a camera, most adjacent to the average view, as the intra-picture;
selecting an image of a camera, most adjacent to the intra-picture, as the bidirectionally predictive picture; and
selecting an image of a camera, most adjacent to the bidirectionally predictive picture, as the unidirectionally predicted picture.

13. The multi-view image coding method of claim 12, wherein, when at least two images exist that are not selected as one of the intra-picture, the bidirectionally predictive picture, and the unidirectionally predicted picture, the selecting repeatedly performs the selecting of the bidirectionally predictive picture and the selecting of the unidirectionally predicted picture with respect to the at least two images, and
when one image exists that is not selected as one of the intra-picture, the bidirectionally predictive picture, and the unidirectionally predicted picture, the selecting selects the unselected image as the unidirectionally predicted picture.

14. The multi-view image coding method of claim 11, wherein the computing of the average view comprises:
computing an average position of the plurality of cameras;
computing an average location of the plurality of cameras; and
computing the average view using the average position and the average location.

15. The multi-view image coding method of claim 11, wherein the coding of the images of the plurality of cameras codes the unidirectionally predicted picture by referring to the intra-picture, and codes the bidirectionally predictive picture by referring to the intra-picture and the unidirectionally predicted picture.

16. The multi-view image coding method of claim 11, further comprising:
determining a temporal prediction structure used to predict a correlation based on a time change with respect to each of the images of the plurality of cameras; and
coding each of the images of the plurality of cameras based on the temporal prediction structure.

17. The multi-view image coding method of claim 11, further comprising:
selectively transmitting any one of the intra-picture, the bidirectionally predictive picture, and the unidirectionally predicted picture.

18. The multi-view image coding method of claim 17, wherein the transmitting transmits at least one of the intra-picture and the unidirectionally predicted picture, when a transmission bandwidth is equal to or less than a predetermined value.

19. At least one computer-readable recording medium storing a program for implementing a multi-view image coding method, comprising:
extracting geometric information from a plurality of cameras;
determining a spatial prediction structure of images of the plurality of cameras using the geometric information; and
coding the images of the plurality of cameras based on the spatial prediction structure,
wherein the determining of the spatial prediction structure comprises:
computing an average view of the plurality of cameras; and
computing a distance between the average view and a view of each of the plurality of cameras, and
wherein the program is executed using at least one processor to perform the method.

* * * * *